May 1, 1956 R. D. BÜGEL 2,743,841
VENT FOR METAL HOUSING FOR ELECTROLYTIC CAPACITORS
Filed April 18, 1952
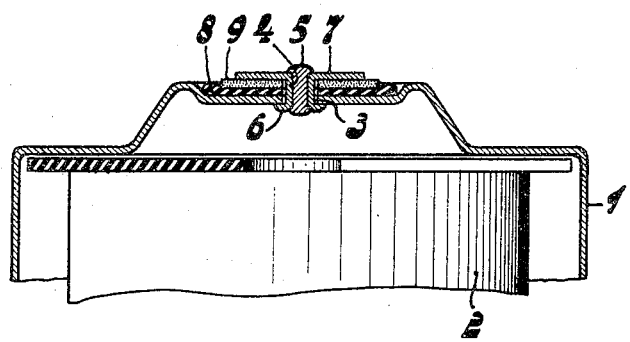
INVENTOR
Roelof Dirk Bügel
BY Fred M Vogel
AGENT

United States Patent Office 2,743,841
Patented May 1, 1956

2,743,841

VENT FOR METAL HOUSING FOR ELECTROLYTIC CAPACITORS

Roelof Dirk Bügel, Eindhoven, Netherlands, assignor to Hartford National Bank and Trust Company, Hartford, Conn., as trustee Application April 18, 1952, Serial No. 283,152

Claims priority, application Netherlands June 9, 1951

3 Claims. (Cl. 220—89)

This invention relates to a metal housing for the winding of an electrolytic capacitor, comprising an inlet member provided in the wall, the packing between this member and the wall being obtained by means of a rubber layer compressed between a flange of the member and the wall.

It is known to provide the housing of an electrolytic capacitor with a safety valve. This valve has to provide that, in the event of rapid evolution of gas in the capacitor due to short circuit or overload, the gas pressure in the housing cannot rise to a value such that there is a risk of explosion. In a known embodiment the valve is formed by a flanging tube provided in the wall, its central aperture being sealed by means of a low-melting point mass, for example, Wood's metal. The packing between the flanging tube and the housing is formed by a rubber ring which is compressed between a flange of the flanging tube and the wall. With a further embodiment the valve is formed by a diaphragm in the wall of the housing, which diaphragm is torn at a given difference in pressure.

The said valves have a limitation in that they are either completely gas-tight or allow all the gas to pass. Other valves are known which permit a continuous equalising of the gas pressure from the inside to the outside. Such a valve may, for example, be formed by a rubber ribbon which covers a number of ventilation apertures. However, such valves are not liquid-tight.

The invention has for its object to provide means by which the gas pressure inside the housing can be constantly equalised and which nevertheless provide a completely liquid-tight seal.

According to the invention a metal housing for the winding of an electrolytic capacitor, having an inlet member provided in the wall of the housing, the packing between this member and the wall being obtained by means of a rubber layer compressed between a flange of the member and this wall, is characterised in that between the flange and the wall provision is made of an additional layer, of glazed cardboard or of other material, which allows gas to pass, but which is liquid-tight, a layer of rubber or of similar elastic material being provided at least between this layer and the wall. The term "inlet member" is to be understood here to mean a member which is taken through the wall of the housing. It may be a member which serves to establish an electric connection through the wall, but this is not necessary. The construction according to the invention provides that differences in pressure, if any, between the interior of the housing and the surrounding atmosphere can be equalised through the layer of material which allows gas to pass. Since this equalising is performed very slowly, it is advisable to use, in addition, a valve of the type opening upon high internal excess pressure. For this purpose use is preferably made of an inlet member formed by the flanging tube of the known safety fuse, which is sealed with respect to the housing in the manner described above.

In order that the invention may be more clearly understood and readily carried into effect, it will now be described more fully with reference to the accompanying drawing by way of example.

The figure shows a sectional view of part of an electrolytic capacitor.

Referring to this figure, 1 designates the top part of an aluminium tube, in which a winding 2 of an electrolytic capacitor is housed. At the end of the tube provision is made of a flanging tube 4 in an aperture 3. The central aperture of this flanging tube is sealed by a mass 5, having a low melting point, for example Wood's metal. A folded edge 6 of the tube 4 bears on the inner side of the wall of the tube and packing means are pinched between a flange 7 of the tube on the other side and the outside of the housing. These packing means are formed by a rubber ring 8 bearing on the wall of the housing and, by a ring 9 of glazed cardboard on top of the former. When the edge 6 is folded, the two rings are compressed between the flange 7 and the wall of the housing. Together they form a packing, which does not permit liquid to pass. However, since the material of the ring 9 allows gas to pass, gas pressure equalising between the interior and the exterior of the housing 1 may take place. The glazed cardboard, however, does not permit liquid to pass, neither can liquid leak away on the lower side of this ring, so that there is substantially no risk of electrolyte leaking away from the winding 2.

Instead of using a single rubber ring 8, use may be made of a rubber ring on both sides of the glazed cardboard, so that any leakage of liquid on the top side of the ring 9 is avoided, which might occur, if the flange 7 does not sufficiently engage the glazed cardboard. Usually the flange 7 is not very thick, so that upon folding the tube 4 it is sufficiently deformed to engage the glazed cardboard over a large surface, so that a complete seal is obtained.

Instead of using a separate ring 8, the ring 9 may be provided on one side or on both sides with an adhered rubber layer by means of an adhesive between the abutting faces of said ring and layers.

What I claim is:

1. A housing for a wound electrolytic capacitor comprising a container for the capacitor winding being provided with an opening in a wall portion thereof, a hollow tubular member fitting loosely in said opening to provide a restricted gas passage between said member and the wall, said member provided with a radially outwardly extending flange on the outside of and spaced from said wall, a mass having a low melting point positioned in and sealing the bore of said tubular member, an annular seal clamped between said flange and the wall portion and loosely surrounding said tubular member and comprising a gas-tight first washer of resilient material in direct contact with said wall portion, and a second washer of fluid-tight but gas permeable material superimposed on said first washer, and engaging said flange, said tubular member being provided on its inner end with the radially outwardly extending flange engaging the inner surface of the wall around the opening in non-sealing relation.

2. A housing for a wound electrolytic capacitor as set forth in claim 1 wherein said first washer is adhered to said second washer.

3. A housing for a wound electrolytic capacitor comprising a metal container for the capacitor winding being provided with an opening in a wall portion thereof, a hollow tubular member fitting loosely in said opening to provide a restricted gas passage between said member and the wall, said member provided with a radially outwardly extending flange on the outside of and spaced from said wall, a mass having a low melting point positioned in and sealing the bore of said tubular member, an annular seal clamped between said flange and the wall portion and loosely surrounding said tubular member and comprising a first rubber washer in direct contact with said wall portion, and a second glazed cardboard washer superimposed on said first washer, said second washer being fluid-tight but gas permeable said tubular member being provided on its inner end with the radially outwardly extending flange engaging the inner surface of the wall around the opening in non-sealing relation.

References Cited in the file of this patent

UNITED STATES PATENTS

| | | |
|---|---|---|
| 1,930,578 | Barrett | Oct. 17, 1933 |
| 1,997,185 | Sprague et al. | Apr. 9, 1935 |
| 2,099,599 | De Lange | Nov. 16, 1937 |
| 2,113,405 | Junken | Apr. 5, 1938 |
| 2,173,999 | Grundstrom | Sept. 26, 1939 |
| 2,580,340 | Zimmer | Dec. 25, 1951 |
| 2,606,941 | Ruben | Aug. 12, 1952 |
| 2,606,942 | Bonin | Aug. 12, 1952 |
| 2,632,784 | Marsal et al. | Mar. 24, 1953 |